(12) United States Patent
Heidingsfeld et al.

(10) Patent No.: US 6,823,359 B1
(45) Date of Patent: Nov. 23, 2004

(54) SYSTEM AND METHOD FOR CONTINUALLY UPDATING DYNAMIC DATA

(75) Inventors: Eytan Heidingsfeld, Ra'anana (IL); Dov Frohlich, Beit Shemesh (IL)

(73) Assignee: PFS Trader Tools, LLC, New York, NY (US)

( * ) Notice: Subject to any disclaimer, the term of this patent is extended or adjusted under 35 U.S.C. 154(b) by 693 days.

(21) Appl. No.: 09/717,820

(22) Filed: Nov. 21, 2000

(51) Int. Cl.$^7$ ............................................... G06F 15/16
(52) U.S. Cl. ..................... 709/203; 719/310; 719/316; 719/331
(58) Field of Search ................................. 719/310–320, 719/331–332; 709/200–203

(56) References Cited

U.S. PATENT DOCUMENTS

| | | | | |
|---|---|---|---|---|
| 6,055,541 A | * | 4/2000 | Solecki et al. | 707/103 R |
| 6,529,910 B1 | * | 3/2003 | Fleskes | 707/10 |
| 6,574,660 B1 | * | 6/2003 | Pashupathy et al. | 709/217 |
| 6,631,512 B1 | * | 10/2003 | Onyeabor | 717/100 |
| 2002/0055878 A1 | * | 5/2002 | Burton et al. | 705/26 |

* cited by examiner

*Primary Examiner*—St. John Courtenay, III
(74) *Attorney, Agent, or Firm*—Klauber & Jackson (57) ABSTRACT

A system and method for continually updating dynamic data on a web-page of a user on a real-time basis and without requiring refreshment of the web-page by employing a contribution, distribution and display tier.

3 Claims, 9 Drawing Sheets

SYSTEM AND METHOD FOR CONTINUALLY UPDATING DYNAMIC DATA

FIELD OF THE INVENTION

The present invention generally relates to a system and method for delivering dynamic data to an Internet Web browser. More specifically, the present invention relates to a method and system for creating web pages that continually update data on a real-time basis without requiring refreshment of the web page and/or installment of any additional software on the users target computer (e.g. no requirement to download any applet, program or compiled code).

BACKGROUND OF THE INVENTION

Prior to the widespread use of the Internet, companies interested in distributing information over a network to a large number of users were typically forced to invest in private networks. Disadvantages of these networks included the expense to install and maintain such a network. In addition, in some cases, more than one private network had to be installed to handle multiple data requirements.

With the advent of the Internet and the more easily-accessible World Wide Web ("Web") that is overlaid on it, many of the above disadvantages have been reduced or eliminated. However, new problems have arisen. For example, although installing costly private networks is no longer necessary to receive the required information, the data distributors may have little to rely on when creating the applications that display this data, in terms of "software toolkits". Their choices are typically limited to using the baseline protocols included in the user's Web Browser such as HTTP or creating stand-alone applications. Each of these approaches may have an associated set of problems such as: (a) "pure" HTTP protocol has an advantage of being accessible by the widest range of browser and operating system platforms, as well as most firewalls but, on the other hand, Web pages that use only HTTP protocol typically cannot display dynamic data without constantly refreshing the entire contents of the embedded frame; (b) creating a stand-alone application that is hosted on an end-users computer (either within a browser or as a separate application) and that can handle the dynamic nature of the data required but may require installation of the application on the target computer; and (c) an IT Department may have to be convinced that the delivery of data into the customer's network would not adversely affect other enterprise-critical applications and systems.

SUMMARY OF THE INVENTION

The present invention provides for a system and method for the delivery of dynamic data to a web page. In one embodiment, the present invention uses a standard HTTP protocol; coexists with firewalls without the need for non-standard ports being open and dedicated to the data retrieval; requires no software to install and/or download (i.e. no requirement to access the user's hard drive); and involves cross-platform support.

In another embodiment, the present invention comprises three tiers: a "contribution" tier, a "distribution" tier; and a "display" tier. The "contribution" tier accepts requests from the end-user and publishes updates of the data content to a "distribution tier". The "distribution" tier then accepts updates from the contribution tier and distributes it to the client application. This client application may include, but is not limited to, a web browser or a stand-alone application that accepts data from the distribution tier over the Internet. Subsequently, the "display tier" receives continuous information from the distribution tier and displays it to the end-user as desired. In accordance with this embodiment, these three tiers deliver data to an end-users web-page or stand-alone application without requiring additional software and/or configuration.

One example of implementing the method and system of the present invention is illustrated with the following. It is understood that this is simply an illustration of the present invention and that the present invention is not limited to the following hardware and software. "DS2000", which is a server application created by PFS TraderTools LLC, supplies data from a variety of real-time and calculated sources from an "API.". Other examples of server applications that may be used instead of "DS2000" include "SmartSockets" by Talarian or "LogicScope" by LogicScope Realisations Limited 2000. In this example, DS2000 is the "contribution" data tier and IIS is a Web server marketed by Microsoft®. This web server, coupled with a DLL (dynamic link library) is part of the "distribution tier". In one embodiment, the DLL is an ISAPI extension DLL. In addition, a programmer's toolkit is employed that facilitates building web pages that communicate with the distribution tier (e.g. facilitates data to be requested and displayed in web pages on Web browsers that support JavaScript). The programmer's toolkit supplies the functionality of the "display" tier.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DETAILED DESCRIPTION

As required, detailed embodiments of the present invention are disclosed herein; however, it is to be understood that the disclosed embodiments are merely exemplary of the invention that may be embodied in various forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

For purposes of the present invention, the term "client" means any application or process that receives data from a server. A process can be both a client and a server. The term "COM" means a protocol published by Microsoft for interprocess communication on the same computer. The term "DCOM" is similar to COM but allows inter-process communications between two or more computers. The term "event" means an occurrence that triggers one or more functions to be executed. The term "executable" means a file containing a machine readable code that is executed within the framework of the underlying operating system. The term "frame" means at least a part of a Web Browser document that may be referred to as a separate web page. A "frame" may be visible or invisible. The term "function" means a specific entry point within a process. The term "Internet" means a Worldwide collection of computers and computer networks that use a set of standard protocols to communicate. The term "message" means data that can be passed to a process. The term "parameters" means information that can be passed to a function. The term "pointer" means an address in memory that refers to a specific variable. The term "server" means any application or process that accepts requests, processes them and returns results. A process may also be both a client and a server. The term "Web Browser" means an application that can render various forms of Web protocol including HTML, XML and/or, JavaScript. The term "web page" means a set of instructions that can be rendered by a Web Browser. The term "Web Server" means a remote system that sends at least one web page and/or data to at lest one Web Client. The term "DLL" means a dynamic link library where functions and/or procedures are loaded at run-time by a process. The term "ECB" means an "extension control block" and contains data about the client and allows access to methods for input/output (read/write). Each client of the web server has its own "ECB." The input/output allows the present invention to communicate directly with a web page. The term "API" means "application programming interface" and refers to the set of methods and functions that facilitate communication between client and server programs. The term "DSClient" is a software component that allows a program to communicate with the server application (e.g. DS2000 application). PFS TraderTool, for example, supplies the application "DS2000" that incorporates the "DSClient" component.

The following is one embodiment of the present invention that comprises three tiers: (a) "contribution" tier, (b) "distribution" tier; and (c) "display" tier. The "contribution" tier is a data handling engine that is capable of handling requests for data using a subscribe-publish mechanism. In one example, the "subscribe-publish" mechanism of the present invention may be implemented using any available server application that incorporates the ability to subscribe to a data topic and trigger an event in a client application when updates to that datum are available. Alternatively, in another example, the "contribution" tier may be designed using a polling mechanism so that the tier may periodically check for updates. In a further example, the present invention may be implemented using server application software (e.g. DS2000) that incorporates the following functionality: (a) accepts requests for data; (b) supports multiple sources of data where each source may be a separate executable source communicating with the main software control process through COM, DCOM, and/or any other type of interprocess communication; (c) supports multiple clients; (d) triggers client events when data is available; and (e) supplies a full range of APIs. The software may also includes a messaging service that aids in fault-tolerance, load balancing and underlying protocol independence.

The "distribution" tier may be implemented using any Web Server that allows an extension DLL to be registered or any other method of extending the server's functionality. In one specific example, the distribution tier employs the Microsoft's IIS Web Server.

The following is an specific example of one method of implementing the present invention employing the "distribution" tier combined with the "display" tier and illustrating an advantage of the present invention of pushing data into a web page dynamically without the web page requiring a refresh. As a result, web pages may be created that contain continuously updating data. This example is for illustration purposes only and is not meant to limit the method or system to either a specific piece of hardware or software. The operation would typically begin when a user loads a web page incorporating the present invention and thus, a login request is sent to a specific Web Server (e.g. "distribution" tier server). That server then connects the web page to the "IIS Web" Server which, in turn, loads the extension DLL if necessary. Once the DLL is loaded, the "distribution" tier is ready to process client communications.

More specifically, in this example, when a web page logs in to the "distribution" tier server, the server performs the following function: (a) creates a client object ("ClientObj") consisting of: (i) an ECB; (ii) a client for communications with the contribution tier, (iii) a unique identification ("UID") that is used to access the correct ClientObj in the list of clients; (b) creates an ECB for the specific client; (c) creates a DSClient for the clients object; (d) assigns the next available index number to the UID; and (e) returns the UID to the Web page for future use by requests from the Display Tier.

The system of the present invention maintains a list of ClientObj that are indexed by UID. By using an ECB, the specific server can send data and commands (e.g. JavaScript) directly to a web page/frame.

Figure 1:
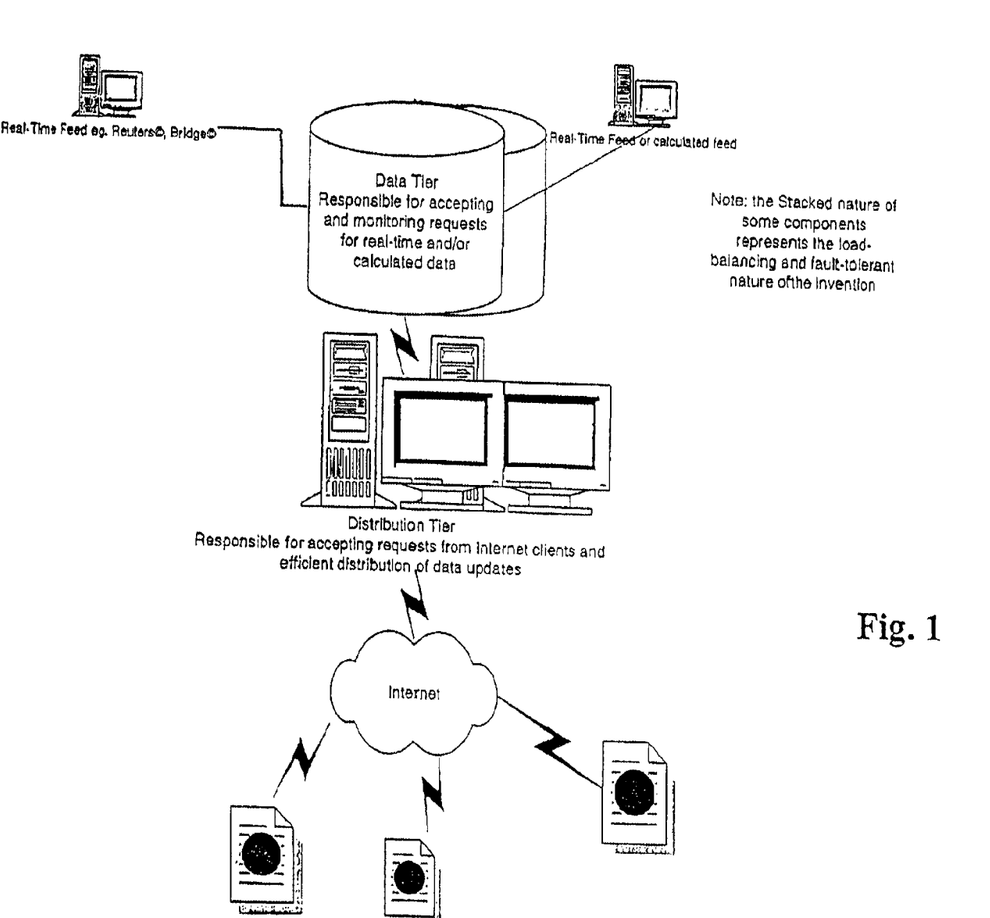
FIG. 1 is an exemplary illustration of one embodiment of the present invention.
Figure 2:
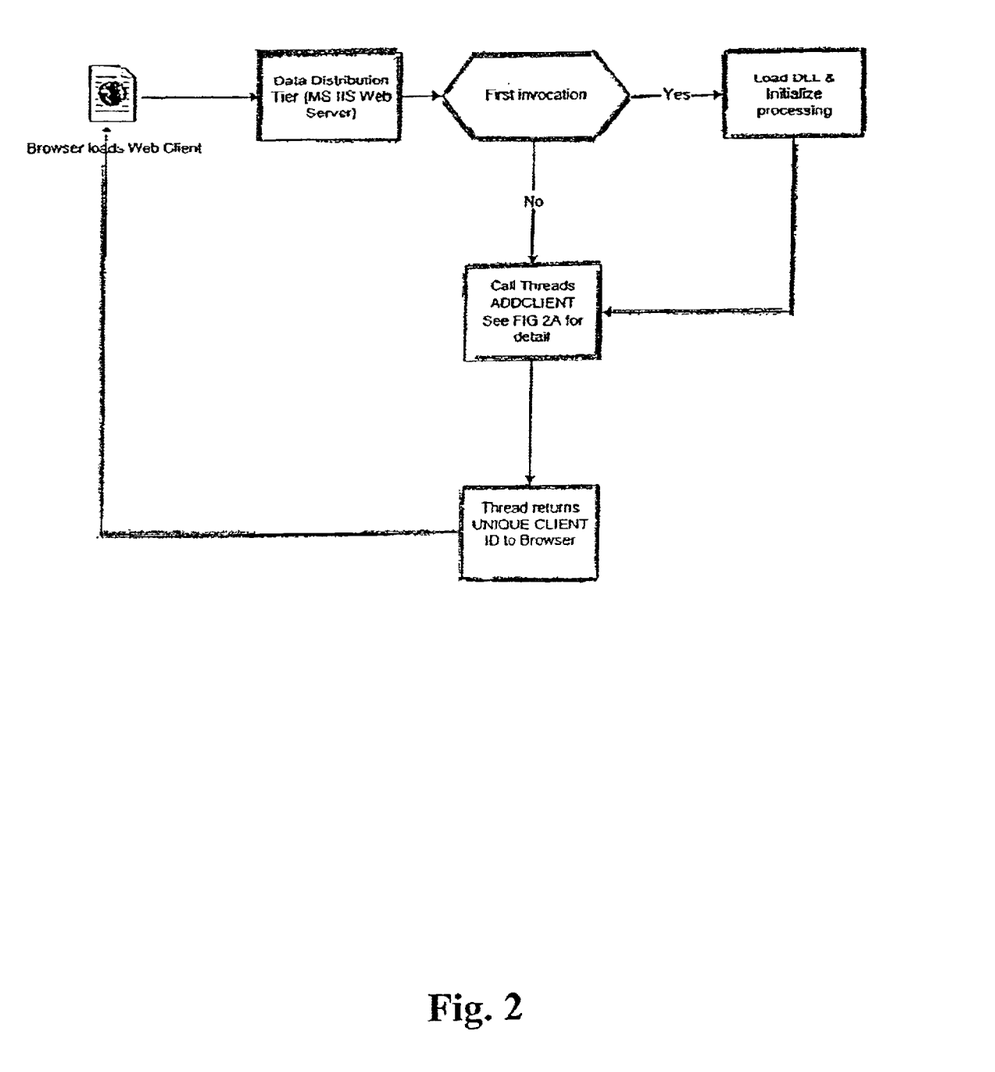
FIG. 2 is a data flow diagram illustrating the "OnPageLoad" process occurs when the end-users first connects to the system illustrated in FIG. 1.
Figure 2A:
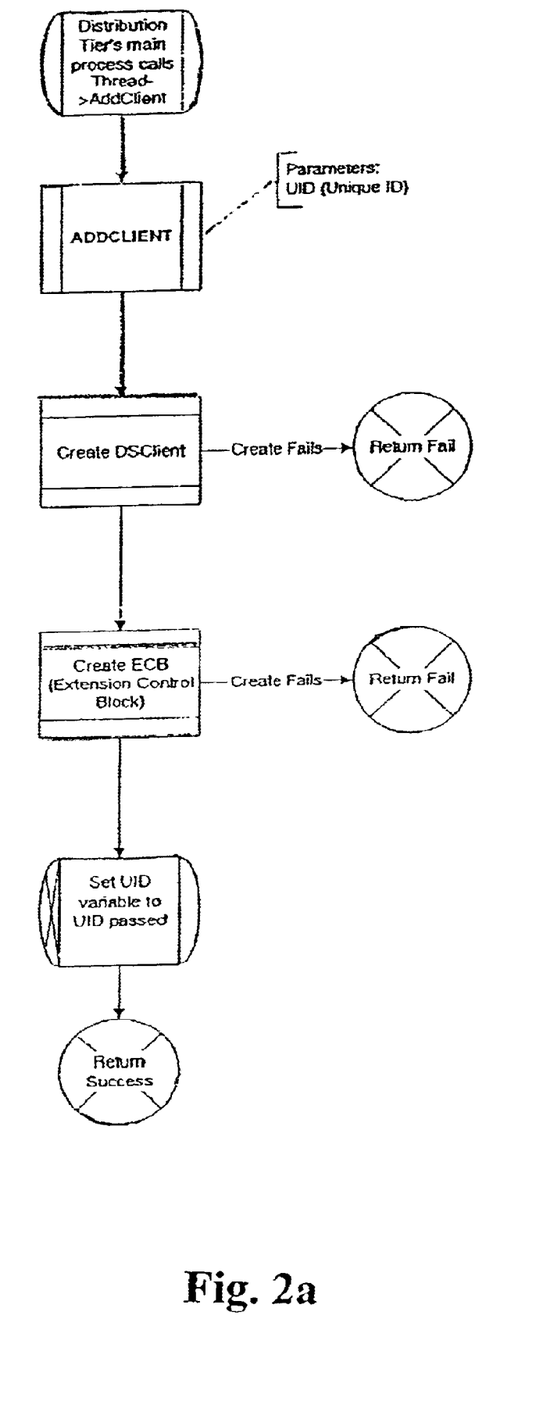
FIG. 2a is a data flow diagram illustrating the "AddClient" function.
Figure 3:
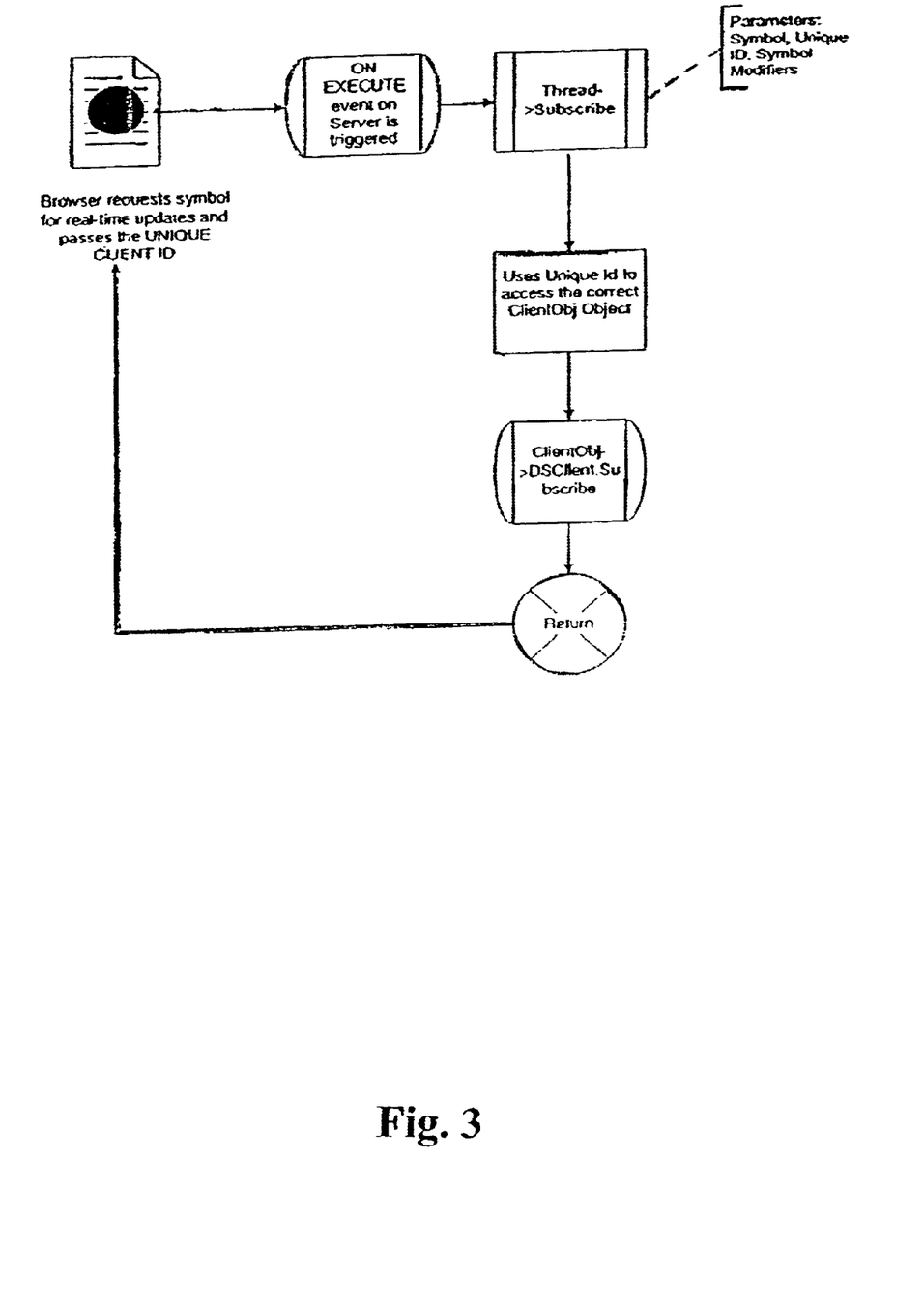
FIG. 3 is a data flow diagram illustrates the "OnDataRequest" process that occurs when the end-user requests a particular piece of data (e.g. "symbol").

After logging into the "distribution" tier server, a web page can begin to send subscription requests. One example of this embodiment is illustrated in FIG. 3 and described as follows. The request sends an execute message to the specific server with the following parameters: (i) UID; (ii) data topic to request; and (iii) additional modifiers for the data topic. The "distribution" tier server uses the UID to locate the correct ClientObj in the client list. The data topic and additional modifiers are then passed to the "contribution tier" as a new subscription request.

Figure 4:
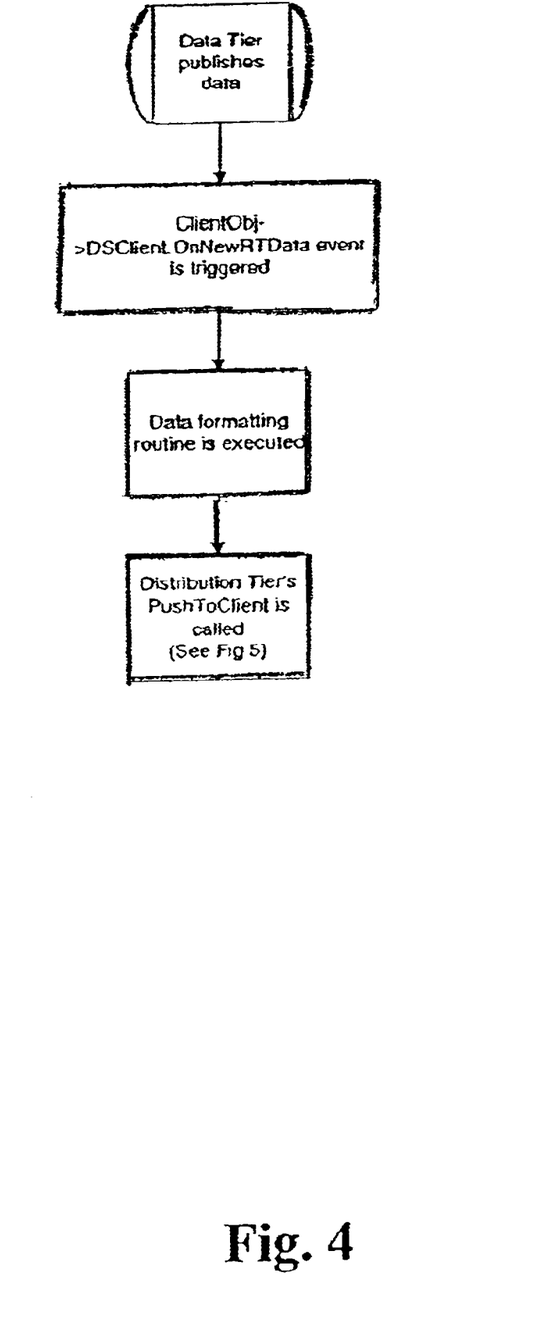
FIG. 4 is a data flow diagram illustrating the "contribution" tier and the "distribution" tier when the contribution tier publishes data.

The contribution tier triggers the "OnNewData" event in the appropriate ClientObj. Since the object already has the correct ECB and the UID as part of the type, the data publication process begins. One example of this embodiment is illustrated in FIG. 4 and described as follows. The OnNewData of the DSClient is executed and new data is received. In one embodiment, the data received may be filtered for acceptability before being sent to the client.

Figure 5:
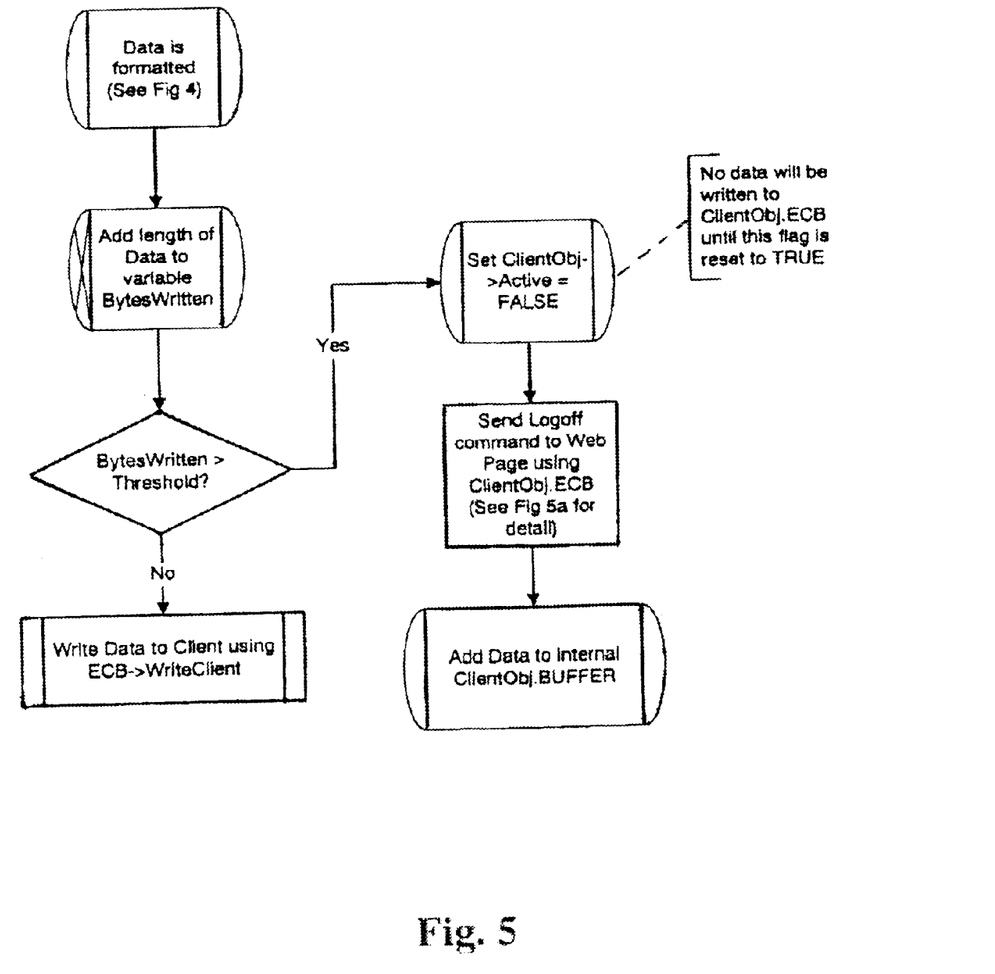
FIG. 5 is a data flow diagram illustrating the communications between the end-users and the dedicated server with the process of "pushing" data onto a Web page.

The next step is the "PushToClient" operation. One example of this "PushToClient" operation is illustrated in FIG. 5 and described as follows. For purposes of understanding FIG. 5, the ClientObj contains a member variable named "BytesWritten". This variable, initialized to 0 when the ClientObj is created, is used to maintain a count of how many bytes have been written to the Client The variable BytesWritten is updated with the number of formatted bytes to send. During the PushToClient process, the length of the data to be sent to the client, including all necessary prologue and epilog information, is calculated and added to the current value of the BytesWritten variable.

Figure 6:
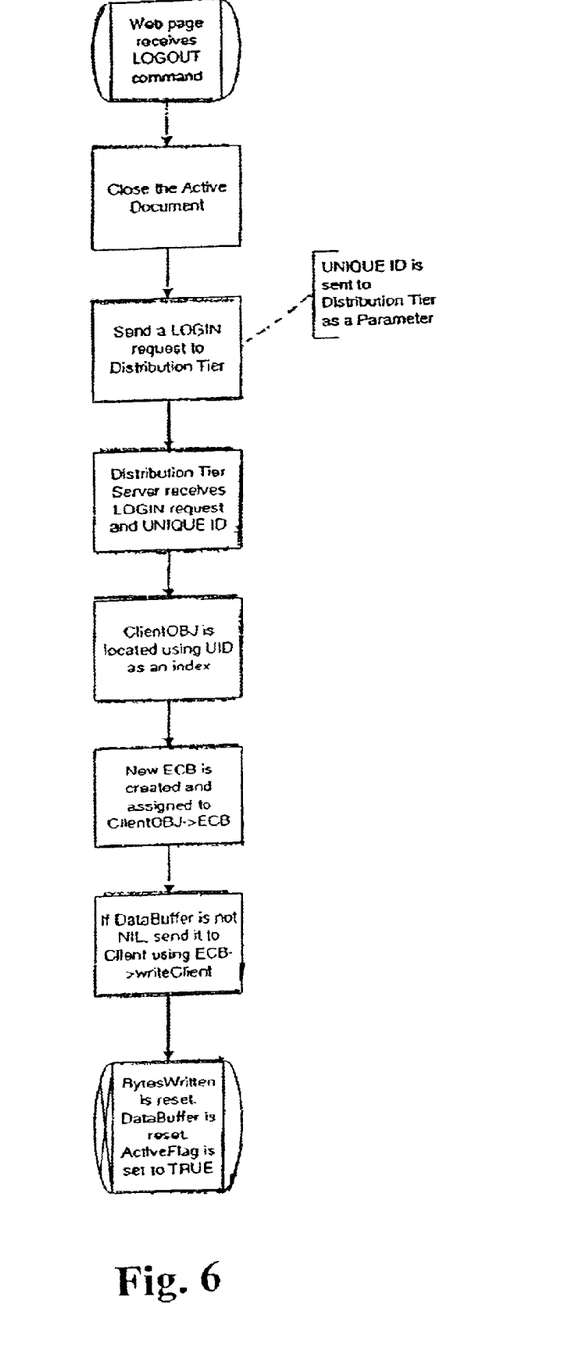
FIG. 6 is a data flow diagram that illustrates the process of the "display" tier with displaying information.

If the variable BytesWritten is less than a certain threshold then the bytes are written to the ClientObj by using theWriteClient function which is provided by the ECB. In contrast, if the variable BytesWritten exceeds a certain threshold then the server follows a different line of execution: (a) the active flag ClientObj is set to False and thus, no data will be actually sent to the client until this flag is set to True; (b) the logoff command is sent to client using the ECB (by sending a logoff command to the Web page using the ECB, the present invention controls the browser's use of memory—if the Web page does not periodically log off, then the browser will consider the sent data to be a single document and will eventually abort); (c) an internal buffer is filled with the outgoing data and will continue to be filled until the Active flag is set to True; and (d) when the Web page receives the Logoff command, it performs the following (FIG. 6 illustrates this example): (i) closes the active document; and (ii) sends a login request to the server as in the Page Load Process, but also sends the UID that was sent in the original login request.

When the distribution tier server receives a Login request with a valid UID, then the following occurs: (a) the corresponding ClientObj is located using the UID as an index; (b) a new ECB is created by the IIS web server and assigned to the ECB member variable of the ClientObj; (c) the internal buffer is sent to the client using the WriteClient function which is provided by the ECB; (d) the BytesWritten is set to Zero; and (E) the Active flag is set to True.

In a further example where the display tier application resides on the user's computer and accepts data from the distribution tier, the display tier may include the following functions: (a) logs into the distribution tier; (b) sends requests for data subscriptions to the distribution tier; (c) accepts updates from the distribution tier; and (c) handles logout and logon commands from the distribution tier.

The present invention will be illustrated in greater detail by the following example. It is understood that this example is given by way of illustration and is not meant to limit the disclosure or claims.

EXAMPLE

Figure 7:
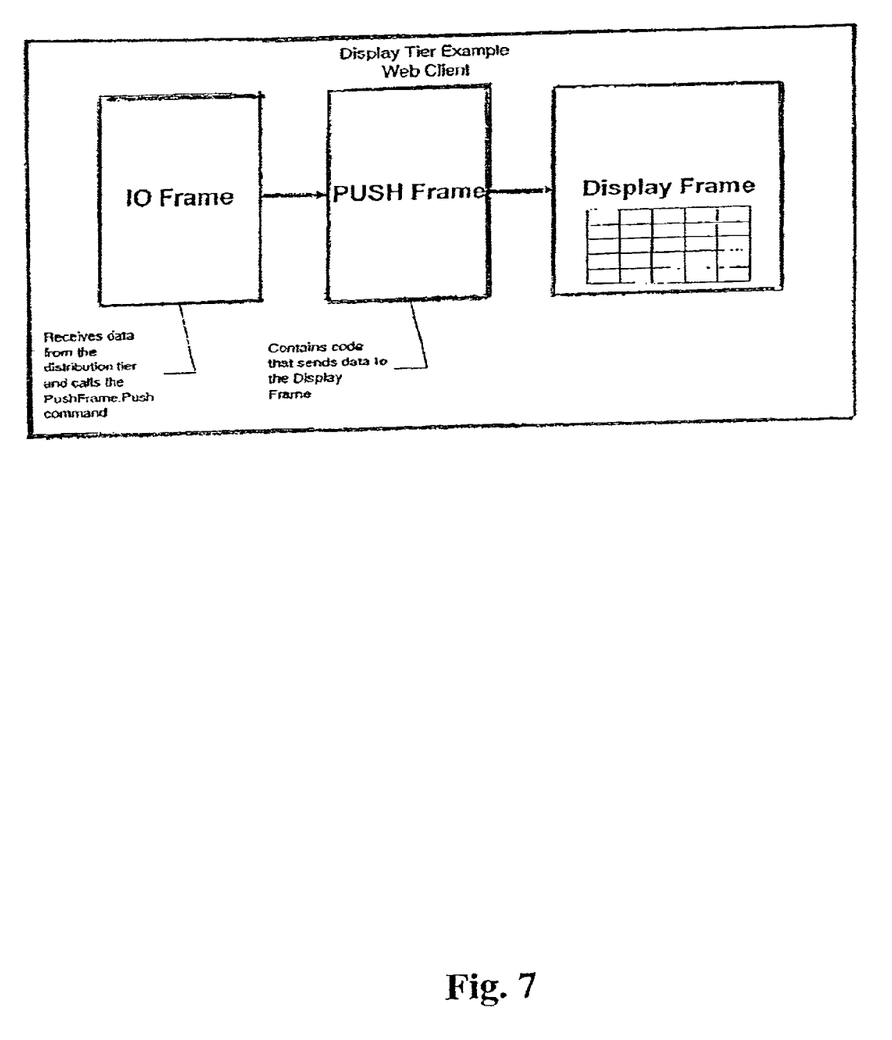
FIG. 7 is an exemplary illustration of the "display" tier.

This illustrates the implementation of the present invention for continually updating the data shown on a web page. For this example, the desired web page contains the following: (a) an invisible frame (the IO frame); (b) an invisible frame (the PUSH frame); (c) a visible frame used for data display (the display frame); and (d) at least one display components that may consist of standard GUI (Graphical User Interface) elements such as list boxes, labels, tables and grids. FIG. 7 is an illustration of this web page.

For this desired web page, the IO frame accepts data from the distribution tier and sends it to the push frame. The push frame communicates with the display frame and presents the data to the user in some specific manner such as a table, a list box, and/or a moving ticker.

When the web page is loaded, an initial connection is made to the distribution tier. For this example, the distribution tier consists of an IIS Web Server and an ISAPI extension DLL. Subsequently, the web page causes the IIS Web Server to load the DLL if it has not already been loaded. The DLL then adds this client which is using a web page as the display tier to its list of clients.

Figure 8:
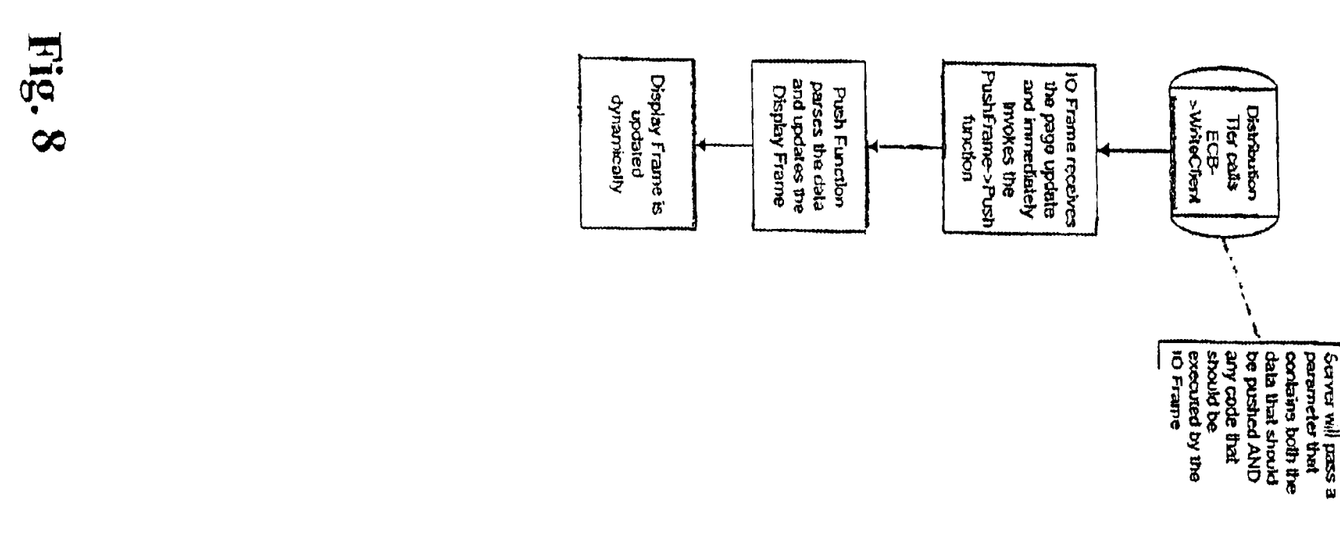
FIG. 8 is a data flow diagram illustrating the process of "pushing" data onto a Web page.

At the time the web page requires real-time data, it sends a submit request to the distribution tier. This invokes the ISAPI DLL and follows the path defined by "Accept subscription requests from the Display Tier" (See FIG. 3). FIG. 8 then illustrates the "acceptdata" operation. For this example, the IIS web Server assigns the value to the WriteClient which is a function of ECB with data and code that will be executed by the IO Frame when received. The code starts Push function which is a function of the PushFrame. The Push Frame's Push function is invoked and the data is formatted and pushed to one or more of the Display Frame's components.

As previously stated, detailed embodiments of the present invention are disclosed herein; however, it is to be understood that the disclosed embodiments are merely exemplary of the invention that may be embodied in various forms. It will be appreciated that may modifications and other variations that will be appreciated by those skilled in the art are within the intended scope of this invention as claimed below without departing from the teachings, spirit and intended scope of the invention.

For example, the architecture is not necessary limited to the specific Web server and client described here. It is not necessary to implement the entire Server API (Applications Programming Interface) in an ISAPI DLL. Other embodiments of the invention might not require a contribution tier. Additionally, the display tier need not be implemented as a Web page but could be an application that communicates with any Internet recognized protocol. For example, the display tier could be implemented as a Microsoft Word document that communicates with the distribution tier using HTTP. As another example, the display tier could be a database that is being populated with real-time data distributed by the distribution tier. In an environment where there is no firewall to penetrate, HTTP is not necessary as the transport protocol. TCP/IP could be used instead.

What is claimed is:

1. A method of continually updating dynamic data on a web-page of a user on a real-time basis comprising the steps of:
   (a) accepting a data request from the user and supplying the data request to step (b);
   (b) accepting updates from step (a) and distributing to a client application; and
   (c) sending login requests and data requests to step (b), receiving continuous updated data from step (b), and continually displaying the updated data on the web-page without requiring refreshment of the web-page, wherein the dynamic data is updated without requiring the installment of additional software on a user's target computer.

2. A method of continually updating dynamic data on a web-page of a user on a real-time basis comprising the steps of:
   (a) loading the web-page;
   (b) sending a login request from the web-page to a distribution tier server;
   (c) loading a DLL on the server;
   (d) performing the functions on the server of:
      (A) creating a ClientObj comprising: (i) an ECB; (ii) a client for communications with step (b); and (iii) UID that accesses the correct ClientObj in the list of clients;

(B) creating a DSClient for the Client Obj;
(C) assigning the next available index number to the UID; and
(D) returning the UID to the Web page;
(e) sending requests comprising the UID from the web-page to the server;
(f) matching the UID request from step (e) with the corresponding Client Obj on the server;
(g) sending the data update on the web-page; and
(h) displaying the updated data on the web-page without requiring refreshment of the web-page.

3. The method of claim 2, wherein step (e) employs a mechanism selected from the group consisting of subscribe-publish mechanism and polling mechanism.

* * * * *